INVENTORS
Carl W. J. Hedberg
and Harry A. Wintermute
BY Harold T. Stowell
ATTORNEY

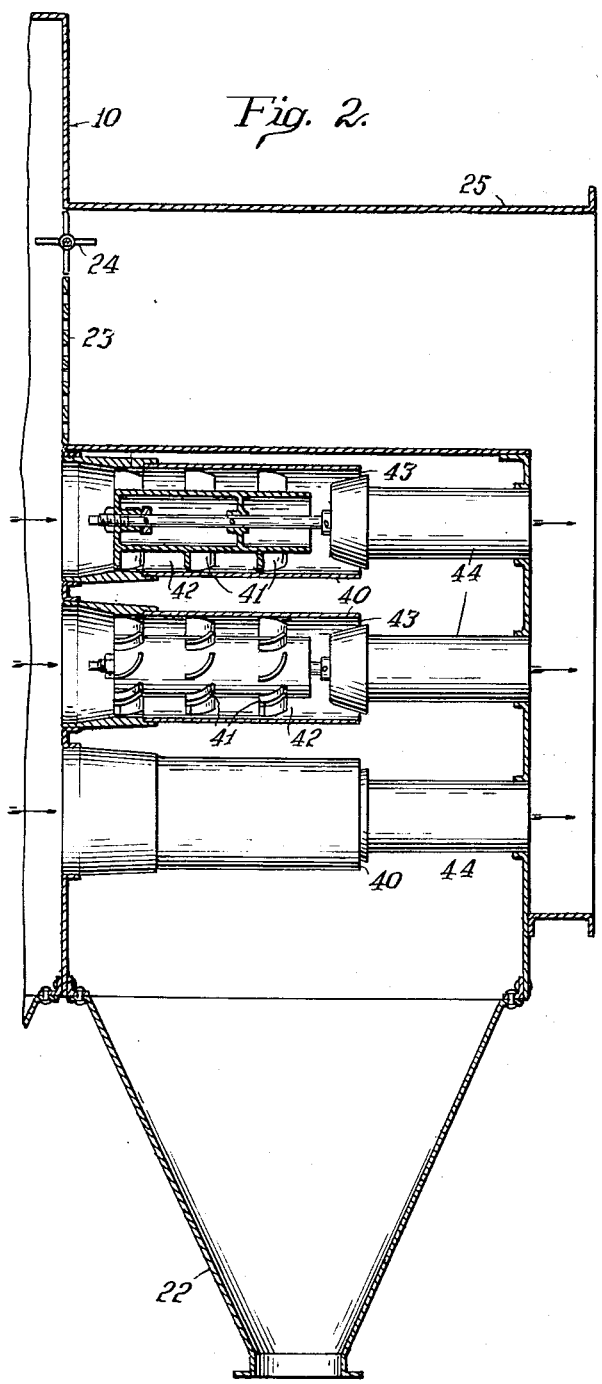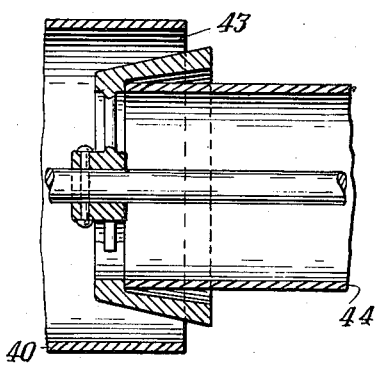

United States Patent Office 2,708,487
Patented May 17, 1955

2,708,487

GAS CLEANING APPARATUS

Carl W. J. Hedberg, Bound Brook, and Harry A. Wintermute, Plainfield, N. J., assignors to Research Corporation, New York, N. Y., a corporation of New York Application July 7, 1952, Serial No. 297,522

5 Claims. (Cl. 183—7)

This invention relates to an apparatus for the removal of suspended particles from gases and particularly to an improved combination of electrostatic and mechanical gas cleaning devices.

A principal object of the invention is to provide improved apparatus for the removal of suspended particles from gases.

A further object of the invention is to provide a combination of electrostatic and vortical gas cleaning devices of increased efficiency.

It has been found that the gases leaving large horizontal flow electrical precipitators have in general a much higher proportion of residual unseparated suspended material in the lower portion of the gas stream than in the upper portion and that a very substantial improvement in the overall efficiency of the gas cleaning apparatus may be provided by subjecting only the lower portion, for example the lower one-third, one-half or two-thirds, of the gas leaving the electrical precipitating zone to a mechanical cleaning. Particularly suitable for the purpose of the invention are vortical gas cleaning devices which effect separation of suspended particles by subjecting the gases to whirling or sharp turning movements, but other mechanical cleaning devices such as filters may be used.

In order to maintain uniformity of gas flow in the precipitator and the desired distribution of the gas through the mechanical separator, suitable flow control devices, such as dampers, are preferably provided in the upper portion of the gas outlet flue.

The principles of the invention are illustrated in the accompanying drawings in which:

Fig. 2 is a partial sectional elevation of a modified embodiment of the invention; and Fig. 3 is a fragmentary enlarged section of one of the separating units of Fig. 2.

Figure 1:
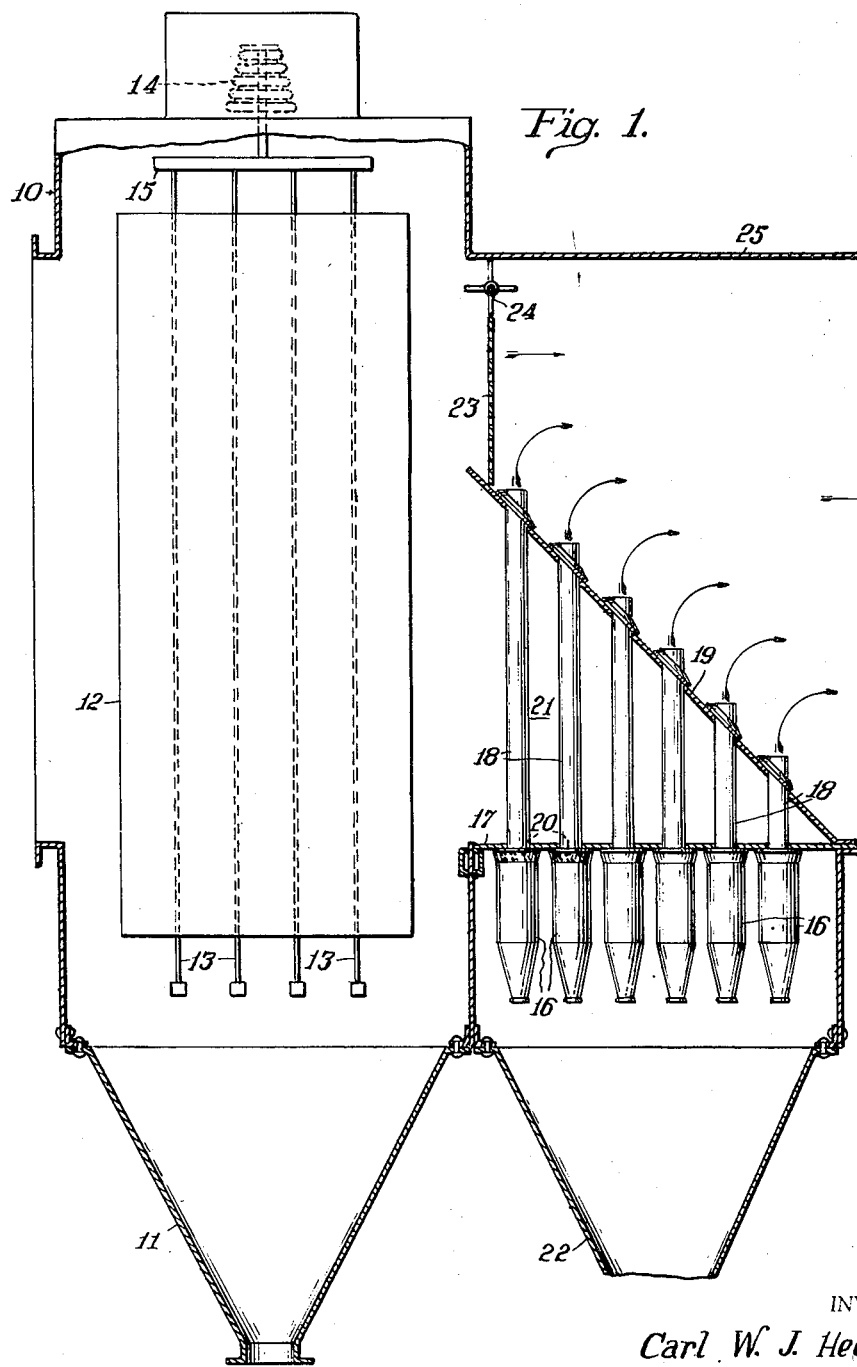
Fig. 1 is a partial sectional elevation of a gas cleaning device embodying a combination of electrical precipitation and selective mechanical cleaning with multiple cyclone cleaning units.

In Fig. 1, 10 is the shell of an electrostatic precipitator having a material collecting hopper 11 at the bottom and provided with vertical extended surface collecting electrodes 12 and complementary discharge electrodes 13 suspended from insulator 14 through beam 15.

In the lower portion of the gas outlet flue 25 a bank of vortical separators 16 are vertically positioned in partition 17, with their concentric outlet tubes 18 projecting through sloping partition 19. Vane members 20 impart a vortical motion to the gas entering the separator tubes 16 from inlet chamber 21 between partitions 17 and 19, and the material separated from the gas drops out of the lower ends of the separator tubes 16 into hopper 22.

Extending across the upper portion of the outlet flue 25 above partition 19 is a perforated partition 23 selected to provide a resistance to gas flow which will substantially balance the resistance of the vortical separators so as to maintain substantially uniform gas flow throughout the cross-section of the electrical precipitator. Finer adjustments of the relative gas flow in the lower and upper portions of the outlet flue can be made with damper 24.

The damper 24 may also be used to cause all or a large portion of the gases to by-pass the mechanical gas cleaning means whenever gases which do not require the mechanical cleaning are being treated, for example, during periods when oil or gas is being burned in the boilers in place of coal.

In the apparatus of Figs. 2 and 3 a plurality of horizontal separator tubes 40 are positioned in the lower portion of the gas outlet flue 25. Gas entering the tubes 40 is given a vortical motion by vanes 41 in the annular spaces 42 which concentrates suspended material in the gas layer at the periphery of the tubes. This layer of concentrated material is skimmed off through annular slots 43 and drops into hopper 22. The major portion of the gas flows out into the gas outlet flue through outlet tubes 44.

Other types of mechanical separators such as that described in U. S. Patent 2,506,273 to Linderoth may also be used for the purposes of the invention.

In a typical horizontal flue electrical precipitator, treating combustion gas from powdered coal boilers, the gases leaving the precipitating zone are found to carry unprecipitated material in the proportion of 1:2:4 in the top, middle, and bottom thirds, respectively, of the gas outlet flue; the overall efficiency of the precipitator operation is about 89%. The suspended material in the top third of the outlet flue is relatively fine and contains relatively few agglomerated particles. Some agglomerates and some coarse particles are found in the middle third, while the suspended material in the bottom third includes a relatively high proportion of both agglomerates and coarse particles.

By subjecting the gas in the lower two-thirds only of the outlet flue to mechanical separation in accordance with the invention, the overall efficiency can be increased to about 96%, while due to the lower concentration and the extreme fineness of the suspended material in the upper third of the outlet flue, subjecting all of the outlet gas to the same mechanical separation would only increase the overall efficiency to about 97%.

It will thus be seen that the invention makes possible a very substantial reduction in the amount of mechanical gas cleaning eqquipment for a very small reduction in overall efficiency.

We claim:

1. Gas cleaning apparatus comprising in combination with an electrical precipitator having complementary discharge and collecting electrodes arranged for substantially horizontal flow of gases therebetween a particulate material receiving hopper positioned below said discharge and collecting electrodes, mechanical gas cleaning means and gas flow control means to cause from about the lower one-third to about the lower two-thirds of the gas leaving the electrical precipitator to pass through the mechanical gas cleaning means.

2. Gas cleaning apparatus comprising in combination with an electrical precipitator having complementary discharge and collecting electrodes arranged for substantially horizontal flow of gases therebetween a particulate material receiving hopper positioned below said discharge and collecting electrodes, mechanical gas cleaning means positioned in the lower portion of the gas outlet flue of the electrical precipitator and gas flow control means to cause not more than about the lower two-thirds of the gas leaving the electrical precipitator to pass through the mechanical gas cleaning means.

3. Gas cleaning apparatus comprising in combination with an electrical precipitator having complementary discharge and collecting electrodes arranged for substantially horizontal flow of gases therebetween a particulate material receiving hopper positioned below said discharge and connecting electrodes, mechanical gas cleaning means, and gas flow control means to cause the lower portion of the gas leaving the electrical precipitator to flow through the mechanical gas cleaning means.

4. The invention defined in claim 1 wherein the mechanical gas cleaning means are of the vortical flow type.

5. The invention defined in claim 2 wherein the gas flow restricting means comprises a perforate member adapted to offer resistance to the passage of gas therethrough.

References Cited in the file of this patent

UNITED STATES PATENTS

| | | |
|---|---|---|
| 382,614 | Knickerbocker | May 8, 1888 |
| 1,185,136 | Seaman | May 30, 1916 |
| 2,409,563 | Hedberg | Oct. 15, 1946 |
| 2,593,251 | Bonacci et al. | Apr. 15, 1952 |

FOREIGN PATENTS

| | | |
|---|---|---|
| 109,863 | Sweden | Feb. 22, 1944 |
| 314,171 | Germany | Sept. 2, 1919 |